Patented Dec. 9, 1941

2,265,424

UNITED STATES PATENT OFFICE 2,265,424

ARSENOBENZENE

Alfred Fehrle, Bad Soden, Taunus, and Paul Fritzsche, Frankfort-on-the-Main, Germany, assignors to Winthrop Chemical Company, Inc., New York, N. Y., a corporation of New York No Drawing. Application July 9, 1940, Serial No. 344,600. In Germany June 11, 1936

1 Claim. (Cl. 260—445)

The present invention relates to an arsenobenzene which has especially valuable therapeutic properties.

Compounds of the arsenobenzene series, particularly the sodium meta-diamino-para-dihydroxyarsenobenzene-methylene-sulfoxylate are, as is known, excellent agents for combating syphilis and similar diseases. Furthermore, 3-(bis-dihydroxypropyl)-amino-4-hydroxy-4'-hydroxyarsenobenzene-3'-amino-monosulfoxylate shows, as is likewise known, a good efficacy in combating spirochaetes.

Now we have found that 3-(bis-$\alpha,\beta$-dihydroxypropyl)-amino-4-hydroxy-5-acetylamino-4'-hydroxyarsenobenzene-3'-amino-monosulfoxylate of the formula

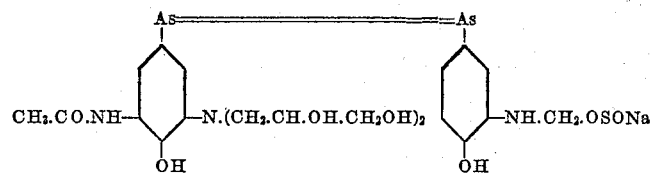

is equal, as regards its action on spirochaetes and trypanosomae, to the best and known arsenobenzene compounds, especially to the two compounds named above and exceeds them as regards its tolerability.

The new compound may be prepared according to known methods in different manners. 3-(bis-$\alpha,\beta$-dihydroxypropyl)-amino-4-hydroxy-5-acetylaminobenzene-1-arsonic acid may be reduced with 3-amino-4-hydroxybenzene-1-arsonic acid to the corresponding arsenobenzene and the formaldehyde-sulfoxylate radical may then be introduced into the last-named compound. Furthermore 3-amino-4-hydroxy-5-acetylamino-3'-amino-4'-hydroxy-5'-acetylamino-arsenobenzene may be condensed with 3-aminosulfoxylate-4-hydroxy-3'-aminosulfoxylate-4'-hydroxy-arsenobenzene so as to obtain 3-amino-4-hydroxy-5-acetylamino-4'-hydroxy-arsenobenzene- 3'-amino-sulfoxylate and the oxalkyl radicals may be introduced into the condensation product thus formed; in that case it is just as convenient to start from an arsenobenzene which already contains the hydroxyalkyl radicals. It is also possible to condense the sodium salt of 3-amino-4-hydroxy-5-acetylaminobenzene-1-arsonic acid with the neutral sodium salt of 3-amino-sulfoxylic acid-4-hydroxybenzene-1-arsonic acid so as to obtain arsenobenzenesulfoxylate and subsequently to introduce the two glycide radicals. Finally it is possible to condense 3-bis-$\alpha,\beta$-dihydroxypropyl-amino- 4-hydroxy-5-acetylamino-3'-bis-$\alpha,\beta$-dihydroxypropyl-amino-4'-hydroxy-5'-acetyl-amino-arseno-benzene with 3-amino-4-hydroxy-3'-amino-4'-hydroxy-arsenobenzene and to introduce the formaldehyde-sulfoxylate radical into the asymmetric arsenobenzene thus obtained. In the same manner 3-amino-sulfoxylate-4-hydroxybenzene-1-arsine may be reduced with 3-(bis-$\alpha,\beta$-dihydroxypropyl)-amino-4-hydroxy-5-acetylaminobenzene-1-arsine-oxide to the corresponding arsenobenzene; in this case, too, the hydroxyalkyl radicals may be subsequently introduced into the arsenobenzene sulfoxylate already formed. Instead of the arsenic oxide the corresponding arsine and instead of the arsine the corresponding arsenic oxide may be condensed with each other.

The new compound is a yellow powder which is readily soluble in water and methyl alcohol, but insoluble in ether, acetone and benzene.

(1) 38.1 grams of 3-(bis-$\alpha,\beta$-dihydroxypropyl)-amino- 4 -hydroxy- 5 -acetylaminobenzene-1-arsonic acid are dissolved in 150 cc. of water and 23.3 grams of 3-amino-4-hydroxybenzene-1-arsonic acid are added thereto, while stirring. By the addition of caustic soda solution of 10 per cent strength the solution is rendered just alkaline to turmeric paper. A solution of 25 grams of potassium iodide in 80 cc. of aqueous hypophosphorous acid of 50 per cent strength is introduced, while stirring, into the thinly liquid magma. During this operation the temperature rises to about 80° C., while the liquid at the same time assumes a yellow coloration. After the liquid has been cooled to room temperature 13 cc. of concentrated hydrochloric acid are added and the clear yellow liquid is stirred into 2 liters of ethyl alcohol. During this operation the dihydrochloride of 3-(bis-$\alpha,\beta$-dihydroxypropyl)-amino-4-hydroxy- 5 -acetylamino- 3' -amino-4'-hydroxyarsenobenzene separates in the form of a yellow pulverulent precipitate which is filtered with suction and washed with ether. The product is readily soluble in water and methyl alcohol and is insoluble in ether and acetone. Instead of hypophosphorous acid there may be used other reducing agents, for instance hydrosulfite.

64 grams of the dihydrochloride of 3-(bis-dihydroxypropyl)-amino- 4 -hydroxy- 5 -acetylamino-3'-amino-4'-hydroxyarsenobenzene are dissolved in a mixture of 150 cc. of water and 150 cc. of methyl alcohol. A solution of 20 grams of formaldehyde sodium sulfoxylate in 40 cc. of water is then added, while stirring and the solution is heated for 20 minutes to about 27° C. A sodium carbonate solution is then added until there is a feebly alkaline reaction to turmeric paper. The clear yellow solution is then stirred into 4 liters of ethyl alcohol; during this operation the 3-(bis-α.β-dihydroxypropyl) - amino- 4 -hydroxy-5-acetylamino- 4' -hydroxyarsenobenzene-3'-amino-sulfoxylate is obtained in the form of a yellow pulverulent precipitate which is filtered with suction and washed with ether. The compound readily dissolves in water to a feebly alkaline solution, but it is insoluble in ether and acetone.

The 3-(bis-α.β-dihydroxypropyl)-amino-4-hydroxy-5-acetylaminobenzene-1-arsonic acid serving as parent material is obtained by nitrating the 4-hydroxy-5-acetylaminobenzene-1-arsonic acid, reducing the nitro-group and heating the amino acid in an aqueous methyl-alcoholic solution with 2 molecules of glycide. The acid is a colorless powder which is readily soluble in water and contains 7 per cent of nitrogen.

(2) 27.65 grams of the dihydrochloride of 3-amino- 4 -hydroxy- 5 -acetylamino-3'-amino-4' -hydroxy-5'-acetylamino-arsenobenzene obtained in the usual manner by the reduction of the corresponding arsonic acid by means of hypophosphorous acid in a hydrochloric acid solution are condensed, while heating, with 28.3 grams of 3-aminosulfoxylate- 4 -hydroxy-3'-amino-sulfoxylate-4'-hydroxy-arsenobenzene in an aqueous solution so as to obtain 3-amino-4-hydroxy-5-acetylamino-4' -hydroxy-arsenobenzene- 3' -amino-sulfoxylate and then heated to about 65° C. together with the corresponding quantity of glycide. The clear yellow solution is stirred into a mixture of ethyl alcohol and ether, the precipitated 3-(bis-α.β-dihydroxypropyl)-amino-4-hydroxy- 5 -acetylamino-4'-hydroxyarsenobenzene-3'-amino sulfoxylate is filtered with suction and washed with ether.

The yellow powder has the same properties as the product obtained according to Example 1.

As starting material there is used 3-amino-4-hydroxybenzene-1-arsonic acid which is reduced in known manner by means of hydrosulfite to 3.3'-diamino- 4.4' - dihydroxyarsenobenzene and then transformed by means of formaldehyde-sodium-sulfoxylate into the corresponding sulfoxylate.

(3) 42.45 grams of the dihydrochloride of 3-bis - α.β-dihydroxypropyl-amino- 4 -hydroxy- 5 - acetylamino-3'-bis-α.β-dihydroxypropyl - amino - 4'-hydroxy - 5' - acetylamino-arsenobenzene, obtained in the usual manner by the reduction of the corresponding arsonic acid, are condensed, with application of heat, together with 28.3 grams of 3 - aminosulfoxylate-4-hydroxy-3'-aminosulfoxylate-4'-hydroxy-arsenobenzene so as to obtain 3-(bis-dihydroxypropyl)-amino-4-hydroxy-5 - acetyl - amino - 4'- hydroxyarsenobenzene-3'-amino-sulfoxylate, and precipitated from the aqueous solution by means of ethyl alcohol and ether. As regards its properties the yellow powder corresponds to the product obtained according to Example 1.

(4) 31.2 grams of the sodium salt of 3-amino- 4-hydroxy-5-acetylaminobenzene-1-arsonic acid and 35.5 grams of the neutral sodium salt of 3-amino-sulfoxylic acid- 4 -hydroxybenzene-1-arsonic acid are condensed with application of heat in an aqueous solution so as to obtain 3-amino-4-hydroxy- 5 -acetylamino- 4' -hydroxyarsenobenzene-3'-amino-sulfoxylate and transformed, as described in Example 2 by the reaction with 2 molecules of glycide into the 3-(bis-α.β-dihydroxypropyl)-amino- 4 -hydroxy-5-acetylamino-4'-hydroxyarsenobenzene- 3' -amino-sulfoxylate.

(5) 84.9 grams of the dihydrochloride of 3-bis-α.β-dihydroxypropyl-amino-4-hydroxy- 5 -acetylamino - 3' - bis α.β - dihydroxypropyl - amino-4'-hydroxy-5'-acetylamino-arsenobenzene and 43.9 grams of the dihydrochloride of 3-amino-4-hydroxy-3'-amino-4'-hydroxy - arsenobenzene, obtained by the process described in U. S. Patent No. 986,148, are dissolved in 500 cc. of water. The solution is heated to about 80° C., filtered and stirred into ethyl alcohol. The yellow precipitate of the dihydrochloride of 3-(bis-α.β-dihydroxypropyl)-amino- 4 -hydroxy- 5 -acetylamino-3'-amino-4'-hydroxyarsenobenzene which has separated is filtered with suction and washed with ether. The compound is readily soluble in water and methyl alcohol and is insoluble in ether and acetone.

64.4 grams of the hydrochloride thus obtained are heated for a short time in an aqueous solution to about 27° C. together with 37 grams of formaldehyde-sodium-sulfoxylate. A yellow precipitate is separated which on addition of sodium carbonate dissolves to a feebly alkaline solution. By stirring it into ethyl alcohol 3-(bis-α.β-dihydroxypropyl) -amino-4-hydroxy-5-acetylamino-4'-hydroxyarseno-benzene - 3' - amino - sulfoxylate separates in the form of a yellow precipitate which is filtered with suction and washed with ether. The product resembles, as regards its properties, to the compound of Example 1.

(6) 38.1 grams of 3-(bis-α.β-dihydroxypropyl) - amino - 4-hydroxy-5-acetylaminobenzene-1-arsonic acid are dissolved in 38 cc. of water and the solution obtained is mixed with a solution of 3.2 grams of potassium iodide in 10 cc. of water. After sulfurous acid has been introduced for several hours the yellow liquid is stirred into a mixture of ethyl alcohol and ether. During this operation 3-(bis-α.β-dihydroxypropyl)-amino-4-hydroxy - 5 - acetylaminobenzene - 1-arsone oxide separates in the form of a nearly colorless precipitate which is filtered with suction and washed with ether.

Furthermore 18.5 grams of 3-amino-4-hydroxybenzene-1-arsine, prepared as described in U. S. Patent No. 1,026,094 are dissolved in 20 times its weight of hydrochloric acid of 5 percent strength and into the solution obtained there is stirred at about 27° C. a solution of 28 grams of formaldehyde sodium sulfoxylate in 60 cc. of water. During that operation a yellow precipitate is separated after a short time; the precipitate is filtered with suction and dissolved in sodium carbonate solution. On addition of ethyl alcohol and ether the 3-aminosulfoxylate-4-hydroxybenzene-1-arsine precipitates therefrom in the form of a yellow granular powder which is filtered with suction and washed with ether. If 28.5 grams of 3-amino-sulfoxylate-4-hydroxybenzene-1-arsine and 40.5 grams of 3-(bis-α.β-dihydroxypropyl) -amino - 4-hydroxy-5-acetylamino-benzene-1-arsine oxide are dissolved in water, the solution which is at first of a yellow-red coloration after a short time assumes a lightyellow color. By the addition of ethyl alcohol and ether there separates from the solution a yellow precipitate of 3-(bis-α.β-dihydroxypropyl)-amino-4-hydroxy-5-acetylamino-4'-hydroxyarsenobenzene-3'-amino-sulfoxylate which is filtered with suction and washed with ether. It corresponds to the product obtained according to Example 1.

It is, of course, just as convenient to condense with each other corresponding quantities of 3-amino-sulfoxylate-4-hydroxybenzene-1-arsine and 3-amino-4-hydroxy-5-acetylaminobenzene-1-arsine-oxide and only subsequently to introduce two dihydroxypropyl-radicals into one of the amino groups by the reaction with glycide.

Instead of arsenic oxide the corresponding arsine and instead of arsine the corresponding arsenic oxide may be condensed with each other.

We claim:

As a new compound the 3-(bis-α.β-dihydroxypropyl)-amino-4-hydroxy-5-acetylamino-4'-hydroxyarsenobenzene-3'-amino-monosulfoxylate.

ALFRED FEHRLE.
PAUL FRITZSCHE.